United States Patent Office 2,776,237
Patented Jan. 1, 1957

2,776,237

TETRAALKYL PYROPHOSPHATE INSECTICIDE STABILIZED WITH ACETIC ANHYDRIDE

William A. Clark, Kirkwood, and Henry L. Morrill, Clayton, Mo., assignors to Monsanto Chemical Company, St. Louis, Mo., a corporation of Delaware No Drawing. Application May 17, 1951,
Serial No. 226,946

2 Claims. (Cl. 167—22)

This invention relates to tetraalkyl pyrophosphates; more specifically, this invention relates to tetraalkyl pyrophosphates effectively stabilized against deterioration or decomposition in the presence of water.

The tetraalkyl pyrophosphates have long been known to possess insecticidal activity. In this regard, the tetraalkyl pyrophosphates wherein each of the alkyl groups contains from 1 to 4 carbon atoms are particularly noteworthy, and of this group tetraethyl pyrophosphate is particularly outstanding, being one of the best insecticides available today. While these pyrophosphates exhibit outstanding insecticidal activity, compositions containing the tetraalkyl pyrophosphates possess a significant deficiency which seriously hampers their widespread utility. The tetraalkyl pyrophosphates are quite susceptible to hydrolysis and the products of hydrolysis exhibit negligible insecticidal activity. Because of this susceptibility to hydrolysis, storage of insecticidal compositions containing the tetraalkyl pyrophosphates in the presence of moisture invariably results in a significant drop of the insecticidal activity of the stored composition.

This hydrolysis problem is quite evident in the case of insecticidal dusts wherein finely divided inert solid carriers are impregnated with about 2% to about 5% by weight of the tetraalkyl pyrophosphate. In view of the great excess of inert carrier present in such a composition, even a low percentage of water in the inert carrier will cause hydrolysis of the tetraalkyl pyrophosphate in the composition to a significant degree. Past efforts to remedy this situation as its exists in insecticidal dusts have not proven to be too successful.

It is an object of this invention to provide stabilized tetraalkyl pyrophosphates. It is a further object of this invention to provide stabilized tetraalkyl pyrophosphates which will thereby be resistant to hydrolysis and the consequent reduction in insecticidal activity thereby permitting the preparation of improved insecticidal compositions. Further objects will become apparent from a description of the invention.

It has now been discovered that tetraalkyl pyrophosphate compositions comprising a tetraalkyl pyrophosphate and acetic anhydride are exceptionally resistant to hydrolysis and will retain their initial tetraalkyl pyrophosphate content and their efficacy as an insecticide even after prolonged periods of storage in the presence of moisture.

This novel invention is not only applicable to the preparation of stable compositions consisting essentially of tetraalkyl pyrophosphates and acetic anhydride, that is, compositions prepared utilizing substantially pure tetraalkyl pyrophosphate, but it is also applicable to the preparation of stabilized tetraalkyl pyrophosphates wherein the tetraalkyl pyrophosphate is a crude product. Substantially pure tetraalkyl pyrophosphate is difficult to prepare and the insecticidal compositions commonly used wherein a tetraalkyl pyrophosphate is the active ingredient are usually prepared utilizing a crude tetraalkyl pyrophosphate. For example, a reaction product containing approximately 40% tetraethyl pyrophosphate is obtained by the reaction of five molecular proportions of triethyl phosphate and one molecular proportion of $POCl_3$ or by the reaction of four molecular proportions of triethyl phosphate and one molecular proportion of $P_2O_5$. A reaction product containing about 15% tetraethyl pyrophosphate is obtained by reacting three molecular proportions of triethyl phosphate and one molecular proportion of $POCl_3$ or by the reaction of two molecular proportions of triethyl phosphate and one molecular proportion of $P_2O_5$. These described reaction products illustrate two of the more frequently used compositions for the preparation of insecticides wherein the active ingredient is to be tetraethyl pyrophosphate. Other reaction products may be prepared containing 10% or less of tetraethyl pyrophosphate or as high as 50% or more of tetraethyl pyrophosphate. The following examples illustrate, but do not limit, the novel compositions of this invention:

*Example I*

The following compositions were prepared and allowed to stand for the indicated period of time to determine the stabilizing action of acetic anhydride in preventing the hydrolysis of tetraethyl pyrophosphate present in the composition. Unless otherwise noted, all percentages are by weight:

Composition A.—95.88% of a reaction product of $POCl_3$ and triethyl phosphate containing approximately 40% tetraethyl pyrophosphate, 4.12% water.

Composition B.—58.6% of a reaction product of $POCl_3$ and triethyl phosphate containing approximately 40% tetraethyl pyrophosphate, 39.0% acetic anhydride, 2.4% water (4.0% water based upon the triethyl phosphate–$POCl_3$ reaction product).

These samples were stored at room temperature and the tetraethyl pyrophosphate content of the composition determined at periodic intervals. The following table sets forth the percentage of the original tetraethyl pyrophosphate contained in the composition which was retained throughout the storage period:

| Composition | Percent Initial Tetraethyl Pyrophosphate Retained | | | |
|---|---|---|---|---|
| | 1 day | 6 days | 20 days | 40 days |
| A | 80 | 24 | 7 | |
| B | 100 | 100 | 100 | 100 |

These results clearly illustrate the outstanding stability of the novel compositions of this invention. The unstabilized sample (A) after 20 days had lost through hydrolysis almost all of the original tetraethyl pyrophosphate present, whereas the sample stabilized in accordance with this invention (B) retained substantially all of the tetraethyl pyrophosphate present in the original sample even after storage for 40 days in the presence of 4% water.

As a further illustration of the outstanding stability of the novel compositions of this invention, Compositions A and B as above described were tested for insecticidal activity utilizing third instar milkweed bugs as the test insects. Compositions A and B as originally prepared exhibited outstanding insecticidal activity. After 38 days Composition A, the unstabilized composition, exhibited negligible insecticidal activity, whereas Composition B, the stabilized composition, after 59 days, exhibited no significant decline in insecticidal activity.

*Example II*

Two insecticidal dust compositions were prepared by impregnating a finely divided pyrophyllite dust with approximately 5% of Composition A as described in Example I and approximately 5% of Composition B as described in Example I. Chemical analysis indicated that each of these insecticidal dusts initially contained 2.1% tetraethyl pyrophosphate. After six days storage, it was found that the insecticidal dust prepared utilizing Composition A, the unstabilized composition, had a tetraethyl pyrophosphate content of 0.16% whereas the insecticidal dust prepared from Composition B, the stabilized composition, had a tetraethyl pyrophosphate content of 1.9%, thereby again indicating the outstanding stability of the novel compositions of this invention.

In each of the preceding examples the tetraethyl pyrophosphate utilized in preparing the compositions described therein can be replaced with any of the tetraalkyl pyrophosphates and similarly outstandingly stable compositions will result. Typical of the tetraalkyl pyrophosphates which may be utilized in the novel compositions of this invention are the following:

Tetramethyl pyrophosphate
Tetrapropyl pyrophosphate
Tetraisopropyl pyrophosphate
Tetrabutyl pyrophosphate
Tetrapentyl pyrophosphate
Tetrahexyl pyrophosphate
Tetraheptyl pyrophosphate
Tetraoctyl pyrophosphate
Diethyl dipropyl pyrophosphate
Dibutyl diethyl pyrophosphate
Dimethyl dipropyl pyrophosphate Particularly preferred compositions are those wherein the alkyl groups in the tetraalkyl pyrophosphate contain from one to four carbon atoms.

The acetic anhydride content of the novel compositions of this invention is subject to substantial variation. Compositions comprising tetraalkyl pyrophosphate and as low as about 1% acetic anhydride and as high as about 75% acetic anhydride have been found to be effective. Concentrations in excess of 75% by weight of acetic anhydride or less than 1% by weight of acetic anhydride may be utilized if desired.

Insecticidal compositions containing the novel compositions of this invention as the active ingredient may be prepared in any form and in any manner well known to those skilled in the art. For example, the novel compositions of this invention may be dissolved in a water immiscible solvent and dispersed in water prior to application as a liquid spray. As previously mentioned, particularly outstanding insecticidal dusts may be prepared by incorporating the novel compositions of this invention into any finely divided inert solid carrier. Typical of the various inert solid carriers which may be used are pyrophyllite, volcanic ash (pumice), diatomaceous earth, clays, talcs, etc. The concentration of the active ingredient in such insecticidal dusts may also be varied over a substantial range. Those compositions containing an inert finely divided solid carrier and from 0.5% to about 25% by weight of a composition comprising a tetraalkyl pyrophosphate and acetic anhydride have been found to be particularly advantageous.

The improved insecticidal compositions of this invention may also have dissolved or dispersed therein various wetting, dispersing and emulsifying agents, such as the alkyl aryl sulfonates, of which sodium dodecylbenzenesulfonate is a particular example, sulfated fatty alcohols, alkyl sulfonates, sulfated esters and acids, amide sulfates and sulfonates, sulfated and sulfonated oils, fats, and waxes, fatty esters of glycerol and glycol and other polyhydric alcohols, such as sorbitol, the condensation products of ethylene oxide with fatty acids, abietic acid, alkylphenols, such as nonylphenol, and mercaptans, such as tert-dodecyl mercaptan, etc., as well as mixtures of these and/or other surface-active agents.

What is claimed is:

1. An insecticidal dust composition comprising an inert solid pulverulent carrier and from 0.5% to about 25% by weight based upon said insecticidal dust composition of a hydrolysis resistant composition containing a tetraalkyl pyrophosphate in an insecticidal amount, the said hydrolysis resistant composition consisting of from about 1% to about 75% by weight acetic anhydride and the remainder being the reaction product of $POCl_3$ and a trialkyl phosphate wherein the said reaction product contains from about 10% to about 50% by weight tetraalkyl pyrophosphate which tetraalkyl pyrophosphate is normally susceptible to hydrolysis, the alkyl substituents of said trialkyl phosphate reactant and said resultant pyrophosphate containing from 1 to 4 carbon atoms.

2. An insecticidal dust composition comprising an inert solid pulverulent carrier and from 0.5% to about 25% by weight based upon said insecticidal dust composition of a hydrolysis resistant composition containing tetraethyl pyrophosphate in an insecticidal amount, the said hydrolysis resistant composition consisting of from about 1% to about 75% by weight acetic anhydride and the remainder being the reaction product of $POCl_3$ and triethyl phosphate wherein the said reaction product contains from about 15% to about 40% by weight tetraethylpyrophosphate.

References Cited in the file of this patent

UNITED STATES PATENTS

| | | |
|---|---|---|
| 1,466,435 | Hammond | Aug. 28, 1923 |
| 1,631,903 | Lande | June 7, 1927 |
| 2,600,378 | Dickey et al. | June 11, 1952 |
| 2,640,800 | Shatto | June 2, 1953 |

OTHER REFERENCES

Chem. Abstracts, vol. 21, page 848 (1927). (Copy in Sci. Libr.)

"The Merck Index," 6th ed., page 7 (1952), M–123. (Copy in P. O. S. L.)

Hall et al., article in Ind. & Eng. Chem., April 1948, pp. 694–699. (Copy in P. O. S. L.)

BIOS Final Report No. 1095, reported by Martin et al., printed by Br. Intelligence Objectives Sub-Committee, March 24, 1947, page 22.